(12) United States Patent  
Li

(10) Patent No.: US 7,453,506 B2
(45) Date of Patent: Nov. 18, 2008

(54) DIGITAL CAMERA HAVING A SPECIFIED PORTION PREVIEW SECTION

(75) Inventor: Yuanzhong Li, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 604 days.

(21) Appl. No.: 10/923,887

(22) Filed: Aug. 24, 2004

(65) Prior Publication Data

US 2005/0046730 A1 Mar. 3, 2005

(30) Foreign Application Priority Data

Aug. 25, 2003 (JP) ............................... 2003-299676

(51) Int. Cl.
  *H04N 5/222* (2006.01)
  *H04N 5/262* (2006.01)
  *H04N 5/225* (2006.01)
  *G06K 9/00* (2006.01)
(52) U.S. Cl. ....................... 348/333.12; 348/240.3; 348/169; 382/118
(58) Field of Classification Search ............ 348/333.12, 348/240.3, 169; 382/118
  See application file for complete search history.

(56) References Cited

U.S. PATENT DOCUMENTS

| | | | | |
|---|---|---|---|---|
| 5,172,234 A | * | 12/1992 | Arita et al. ............... | 348/240.2 |
| 5,835,616 A | * | 11/1998 | Lobo et al. ............... | 382/118 |
| 6,304,292 B1 | * | 10/2001 | Ide et al. ................. | 348/243 |
| 6,516,154 B1 | * | 2/2003 | Parulski et al. .......... | 348/333.05 |
| 6,930,687 B2 | * | 8/2005 | Grosvenor et al. ......... | 348/239 |
| 7,298,409 B1 | * | 11/2007 | Misawa ................... | 348/333.01 |
| 2006/0204054 A1 | * | 9/2006 | Steinberg et al. .......... | 382/118 |

* cited by examiner

Primary Examiner—Nhan T Tran
(74) Attorney, Agent, or Firm—Sughrue Mion, PLLC

(57) ABSTRACT

A digital camera has an image capturing unit, a display unit, a face portion detecting unit, face portion selecting device and a control unit. The image capturing unit photoelectrically captures an image of a subject including a face portion of the subject and obtains image data of the subject. The display unit displays an image of the subject based on the image data obtained by the image capturing unit. The face portion detecting unit detects face portion of the subject from the image data captured by the image capturing unit. The face portion selecting device selects a face portion detected by the face portion detecting unit as a main subject to which attention is to be paid. The control unit controls the display unit to display a face image of the face portion selected by the face portion selecting device, in enlargement.

9 Claims, 5 Drawing Sheets

DIGITAL CAMERA HAVING A SPECIFIED PORTION PREVIEW SECTION

BACKGROUND OF THE INVENTION

The present invention relates to a digital camera capable of capturing a desired image for a photographer upon shooting a scene of a subject including a person or an animal.

Conventionally, a digital camera is provided with a display unit for displaying an image of a photographed subject thereon. A liquid crystal display panel or the like is used for the display unit. The display unit has a small display area and a low resolution. Therefore, when a person, an animal, or the like is photographed together with scenery, the person, the animal, or the like is displayed in a small dimension, which causes hard to recognize various expressions of the person, the animal, or the like on their faces or countenances.

Therefore, conventionally, it has been proposed to apply processing such as a face portion detecting to a preview image, which is displayed on the display unit, before obtaining a final captured image (JP 2001-309225 A, JP 2003-107335 A, and JP 2003-107555 A).

In a camera disclosed in JP 2001-309225 A, a face portion detecting algorithm is executed for a framing image, which is obtained by an image capturing unit, to detect all face portions in the framing image. Then, various algorithms are executed for the framing image to obtain a final captured image. A red-eye detection algorithm is executed for this final captured image. If a red-eye effect is present in this final captured image, warning is displayed on a display device by the red-eye detection algorithm. In the case where the conventional camera is a digital camera, after receiving this red-eye warning, a photographer can execute an automatic red-eye effect correction algorithm in order to remove an unpleasant red highlight portion in the eye of the object. Consequently, an image in which the red-eye effect is corrected can be obtained.

In addition, JP 2003-107335 A discloses a camera (image pickup apparatus) that, when a person is photographed, detects a face portion of the person out of image data and performs automatic focus control with at least a part of the detected person as a target of a range finder. According to this camera of JP 2003-107335 A, regardless of a position of the person in a image, the face portion of the person can be in focus and photographed without changing a image composition from the time of automatic focus operation to the time of shooting the scene.

Moreover, JP 2003-107555 A discloses a camera (image pickup apparatus) provided with an automatic exposure function that is capable of shooting a scene of a person in proper exposure regardless of the position of the person. According to this camera of JP 2003-107555 A, a face portion of the person is detected from image data before shooting the scene, the detected face portion of the person is subjected to photometry, an amount of exposure is calculated based on a result of this photometry, and exposure control is performed based on this amount of exposure.

In the cameras of JP 2001-309225 A, JP 2003-107335 A, and JP 2003-107555 A, red-eye effect, focus, an amount of exposure can be corrected appropriately. However, when a scene including a background is shot, it is difficult to recognize a specified portion of a subject, for instance, the face or countenance of the person or animal to be photographed, and there arises a problem in that a photographer cannot always capture a desired image with a desired expression of a person, an animal, or the like therein.

SUMMARY OF THE INVENTION

It is an object of the present invention to solve the problems of the conventional technique and provide a digital camera with which a photographer can easily capture a desired image of the face of a person, an animal, or the like, or of a specified portion of a subject.

The camera of the present invention includes: an image capturing unit that photoelectrically captures an image of a subject including a face portion of the subject to obtain image data of the subject; a display unit that displays an image of the subject based on the image data obtained by the image capturing unit; a face portion detecting unit that detects face portion of the subject from the image data captured by the image capturing unit; face portion selecting means that selects a face portion detected by the face portion detecting unit as a main subject to which attention is to be paid; and a control unit that controls the display unit to display a face image of the face portion selected by the face portion selecting means, in enlargement.

The digital camera further may include a tracking processing unit that tracks the face portion, which is selected by the face portion selecting means, on the display unit. Preferably, the control unit controls the display unit to display the face image of the face portion of the subject, which is selected by the face portion selecting means and tracked by the tracking processing unit, in enlargement according to an instruction for enlarged display.

More preferably, in a condition that plural face portions are detected from the image data, plural face portions are selected by the face portion selecting means, and the enlarged display of the face images is instructed, the control unit divides a display screen of the display unit into plural areas and controls the display unit to display plural face images in enlargement in the plural areas, individually.

It is also preferable that the digital camera further comprises a recording unit that records, as information, one or both of the image size of the face portion selected by the face portion selecting means on one hand, and the position information of the selected face portion with respect to the image of the subject on the other, as well as the image data.

The present invention also provides a digital camera comprising: an image capturing unit that photoelectrically captures an image of a subject to obtain image data of the subject; a display unit that displays an image of the subject based on the image data obtained by the image capturing unit; a specified portion detecting unit that detects a specified portion of the subject from the image data captured by the image capturing unit on the basis of image information concerning shape or color of the specified portion; a specified portion selecting means that selects a specified portion detected by the specified portion detecting unit as a main subject to which attention is to be paid; a tracking processing unit that tracks the specified portion, which is selected by the specified portion selecting means, on the display unit; and a control unit that controls the display unit to display an image of the specified portion, which is tracked by the tracking processing unit, in enlargement.

Thus, since a photographer can display a face of a person, animal, or the like in enlargement and observe the face, and then photograph the face, the photographer can obtain a desired image easily.

Any other specified portion of a subject to be photographed than the face portion can be extracted on the basis of the already-known information concerning the shape or color of the relevant portion so as to display its image in enlargement so that it is possible for a photographer to photograph the portion in a favorable form.

This application claims priority on Japanese patent application No. 2003-299676, the entire contents of which are hereby incorporated by reference. In addition, the entire contents of a literature cited in this specification are incorporated by reference.

DETAILED DESCRIPTION OF THE PREFERRED EMBODIMENT

A digital camera of the present invention will be hereinafter explained in detail based on a preferred embodiment shown in the attached drawings.

Figure 1:
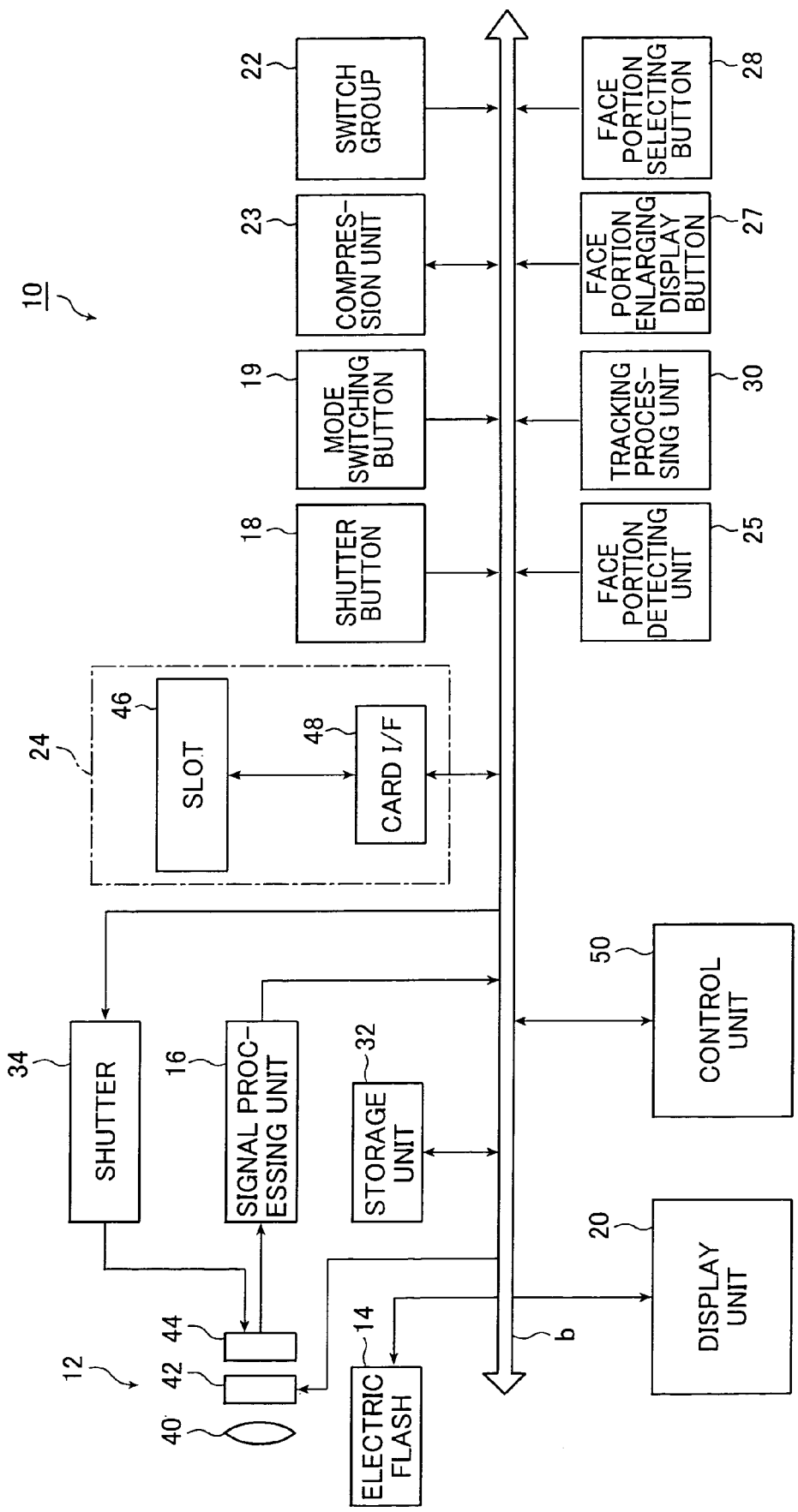
FIG. 1 is a block diagram schematically showing a structure of a digital camera in accordance with an embodiment of the present invention.

FIG. 1 is a block diagram schematically showing a structure of a digital camera in accordance with an embodiment of the present invention.

A digital camera 10 shown in FIG. 1 basically includes a photographing unit 12, an electric flash 14, a signal processing unit 16, a shutter button 18, a mode switching button 19, a display unit 20, a switch group 22, a compression unit 23, a recording unit 24, a face portion detecting unit 25, a face enlarging display button 27, a face portion selecting button 28, a tracking processing unit 30, a storage unit 32 having a DRAM or the like, a shutter 34, and a control unit 50. Note that, in the figure, reference character b denotes a system bus. As described later, the digital camera 10 of this embodiment has at least one special photographing mode such as a face portion detecting mode.

If the subject to be photographed is a person, the face of the person may be displayed on the display unit 20 of the digital camera 10 in enlargement as a specified portion of the subject.

The structure of the digital camera 10 of this embodiment is basically the same as that of a well-known digital camera except that the digital camera 10 has the face portion detecting unit 25, the face enlarging display button 27, the face portion selecting button 28, and the tracking processing unit 30. Therefore, it is needless to mention that the digital camera 10 has, besides the components shown in the figure, a photometry unit for exposure determination, various components provided in a conventional digital camera such as: a microphone for recording; an interface (I/F) such as a connector for making connection with an external apparatus such as a personal computer (PC); a zoom function for the photographing unit 12; a finder; driving means for various mechanical elements; a lamp for indicating an operation state, warning, and the like; and a liquid crystal display panel for selection/instruction of an operation, and means for operating and controlling these components.

The photographing unit 12 is the same as a photographing optical system of a conventional digital camera and includes a focusing lens 40, an aperture stop 42, an (area) CCD sensor 44, and a signal processing unit 16.

The focusing lens 40 focuses an image of a subject (not shown) on the CCD sensor 44. This focusing lens 40 is not specifically limited but may be a focusing lens having a zoom function.

The aperture stop 42 adjusts an amount of light to be directed on the CCD sensor 44 and is provided between the focusing lens 40 and the CCD sensor 44. The aperture stop 42 is connected to the control unit 50, and a stop value of the aperture stop 42 is adjusted by the control unit 50.

The CCD sensor 44 obtains an image signal for each color of the three primary colors of R (red), G (green), and B (blue) from an image of a subject focused by the focusing lens 40, and outputs the image signals of the three primary colors to the signal processing unit 16.

The signal processing unit 16 processes the image signals outputted from the CCD sensor 44 to change the image signals to image data of a photographed image of the subject. This signal processing unit 16 applies, for example, A/D conversion, shading correction, dark current correction, noise removal, and log conversion to the image signals from the CCD sensor 44 to transform the image signals outputted from the CCD sensor 44 to image data of the photographed image.

In addition, the signal processing unit 16 is connected to the storage unit 32 and the control unit 50.

Note that the photographing unit 12 also includes the electric flash 14 and the shutter 34. The electric flash 14 is the same as an electric flash that is mounted on a conventional digital camera. An amount of light emission from the electric flash 14 can also be adjusted by the control unit 50.

The mode switching button 19 switches various photographing modes of the digital camera 10 to be described later such as a face portion detecting mode and a scenery photographing mode which are applied for photographing a scenery, and is connected to the control unit 50. Thereby, various modes of the digital camera 10 to be described later, which is controlled by the control unit 50, is switched by the mode switching button 19. The images in the photographing modes of the digital camera 10 switched by the mode switching button 19 are preferably displayed on the display unit 20.

When the shutter button 18 is pushed, the shutter 34 allows the signal processing unit 16 to output image data for one frame to the storage unit 32. Note that the shutter 34 is not limited to an electric shutter but may be a mechanical shutter. A shutter speed of the shutter 34 is adjusted by the control unit 50 to be described later.

The display unit 20 performs display of a preview image, which is an image before capturing a final photographed image of a photographed subject, display of a captured image, or display for various operations with a graphical user interface (GUI). The display unit 20 is configured with, for example, a liquid crystal display device that is equipped with a conventional digital camera.

As described later, the display unit 20 can display a face portion of the subject to be photographed in enlargement. In addition, as described later, when plural face portions are selected, a display screen is divided according to the number of selected face portions, and the face portions are displayed on the divided screens in enlargement.

The switch group 22 includes various switches with which a user operates the digital camera 10. For example, the switch group 22 includes an electric flash switch, a zoom switch, a display switching button, or a cross button or arrow button used for performing various kinds of selection.

In the digital camera 10 of this embodiment, various operations including an operation for instruction for enlargement of a captured image to be describe later are performed with a GUI using the mode switching button 19, the face enlarging display button 27, the face selection button 28, and display by the display unit 20.

The compression unit 23 compresses image data of a captured image and changes the image data into compressed image data of, for example, the Joint Photographic Expert Group (JPEG) format in order to record the image data in a medium or the like. Image data is outputted from the storage unit 32, and the compression unit 23 compresses this image data. The compression unit 23 is connected to the recording unit 24, and the compressed image data is outputted to the recording unit 24.

The recording unit 24 records image data of a captured image, which is finally captured by photographing, in a medium (recording medium). The recording unit 24 includes a slot 46 in which the medium is inserted and a card I/F 48 for connecting the slot 46. The digital camera 10 of the illustrated example records image data or the like in, for example, a medium inserted in the slot 46 in an image file format of the Exif format. In the present invention, a usable medium is not specifically limited, and various media used in digital cameras such as an xD-picture card™, a smart medium™, a PC card, and a compact™ flash can be used.

The face portion detecting unit 25 applies detection analysis of a face portion in the image to a preview image of a subject photographed by the digital camera 10 to generate face detection position information. For example, as described later, the face portion detecting unit 25 displays a window frame surrounding an area including a face portion displayed on the display screen based on the face detection position information. The area surrounded by the window frame is called a face area. Note that, in the digital camera 10 of this embodiment, it is preferable that the face portion detecting unit 25 have a dedicated processor independent from the processor of the control unit 50.

A face portion detecting method in the face portion detecting unit 25 will be hereinafter explained.

Face portion detection in this face portion detecting unit 25 only has to be performed in a well-known method and is not specifically limited. Examples of this face portion detection include: a face portion detection method according to edge detection or shape pattern detection; a face portion detection method according to hue extraction or skin color extraction; a method involving extracting a candidate area, dividing the nominated area for face portion into small areas, comparing a characteristic value of each area with a characteristic value of a face area pattern set in advance, and extracting a face area based on a degree of assurance for the face area using the characteristic value (JP 2000-137788 A); a method involving extracting nominated areas for a face area by various algorism and evaluating a degree of assurance for the face area based on a degree of overlap of the respective nominated areas to extract the face area (JP 2000-149018 A); and a method involving extracting nominated areas for a face area, and when image density of the respective nominated areas are values corresponding to a predetermined threshold value, extracting nominated areas for a body area, evaluating a degree of assurance for the face area using image density or chroma contrast of the nominated areas for the face area and the nominated areas for the body area, and extracting the face area (JP 2000-148980 A).

The tracking processing unit 30 subjects a face area of a face portion, which is detected by the face portion detecting unit 25 and selected by the face portion selecting button 28, to tracking processing in other images that are obtained for the same subject and the same scene. Positional information of a face portion obtained in a previous image is used (JP 11-015979 A), so that load of work for face tracking processing in one frame of the image in a processing unit is reduced lighter than that for the face portion detecting processing.

The face enlarging display button 27 issues an instruction to display a detected face portion in a preview image on a screen of the display unit 20 in enlargement. Pushing this face enlarging display button 27, the face area is displayed on the screen of the display unit 20 in enlargement by the control unit 50. When releasing the face enlarging display button 27, the preview image is displayed again.

The face portion selecting button 28 is used for selecting a face portion, which a photographer desires to enlarge, among face portions detected by the face portion detecting unit 25. Pushing the face portion selecting button 28, for example, when plural face portions have been detected, a window frame comes out surrounding each of the detected face portions on the screen and the window frame indicating a face area changes in color, from frame to frame for active or not, such that the photographer can check which face portion is about to be selected. With further deep push of the button, the face portion surrounded by the colored window frame is selected. Note that, in this embodiment, an interface for the face portion selection is not specifically limited to the face portion selecting button 28 as long as a face portion can be selected, and various well-known buttons such as a cross key can be used. Plural face portions may be selected by the face portion selecting button 28.

It is preferable that the face portion detecting unit 25 further include memory such as a DRAM. The face portion detecting unit 25 displays a window frame surrounding the face portion in a corresponding image on the display unit 20 in accordance with face position information and the frame window and the face portion are enlarged on the display unit 20.

The storage unit 32 stores image data of an image captured by the digital camera 10. The storage unit 32 has a storage element such as a DRAM and is connected to the photographing unit 12, the signal processing unit 16, the face portion detecting unit 25, and the tracking processing unit 30. Image data is outputted from those units and stored in the storage unit 32 and is further stored in the recording unit 24 through the compression unit 23 from the storage unit 32.

The control unit 50 controls the entire digital camera 10 and is constituted using a CPU or the like.

As described later, when a face portion is detected in captured image by the face portion detecting unit 25, the control unit 50 adds face position information to the image data in which the face portion is detected. Then, the control unit 50 controls the display unit 20 to display a window frame surrounding a face area including the face portion based on this face position information.

In addition, the control unit 50 also controls the display unit 20 to display a result of tracking of a face area by the tracking processing unit 30.

Moreover, the control unit 50 is switched in mode at will between a face portion detecting mode, a scenery photographing mode, and the like by the mode switching button 19. Photographing conditions suitable for various photographing scenes are set in advance in the modes respectively, and a photographer can select one of the modes as a photographing mode.

The face portion detecting mode is a photographing mode for detecting a face of a person, animal, or the like included in a subject, displaying the face portion in enlargement, and identifying the face.

The scenery photographing mode is a photographing mode for photographing scenery. In this scenery photographing mode, the electric flash 14 does not work.

In addition, when the face enlarging display button 27 is pushed, the control unit 50 controls the screen of the display unit 20 to display a face image of the face area selected by the face portion selecting button 28 in enlargement. In this case, the enlarged image of the face image can be generated according to the size of photographing pixels or the like by a well-known method.

A display size of the enlarged image on the screen of the display unit 20 is not specifically limited but only has to be determined appropriately according to a size of the display unit 20. Moreover, the size of enlarged display may be fixed or, alternatively, adjusted appropriately according to a size of the face portion. In addition, a user may select a size of enlarged display.

Moreover, when plural face portions have been selected, the screen may be divided according to the number of the selected face portions to display the face areas in enlargement in divided areas, individually.

In the digital camera 10, it is preferable that one or both of the image size of the face area of the face portion selected by the face portion selecting button 28 on one hand, and the face position information of the selected face portion with respect to the photographed image on the other, are added to the image data and the recording unit 24 records the image data as such. Under that situation, when an image is called up and edited later, an effective edition based on the photographed person can be carried out.

A photographing method in the digital camera of this embodiment will be hereinafter explained. In the photographing method in the digital camera 10 of this embodiment, the face portion detection and the face enlarging display are performed as described later, considering the face of a person to be photographed as a specified portion of the subject. The method is the same as carried out in a well-known digital camera except the face portion detection and the face enlarging display. Thus, a detailed explanation of the photographing method will be omitted except the face portion detection and the face enlarging display.

Figure 2:
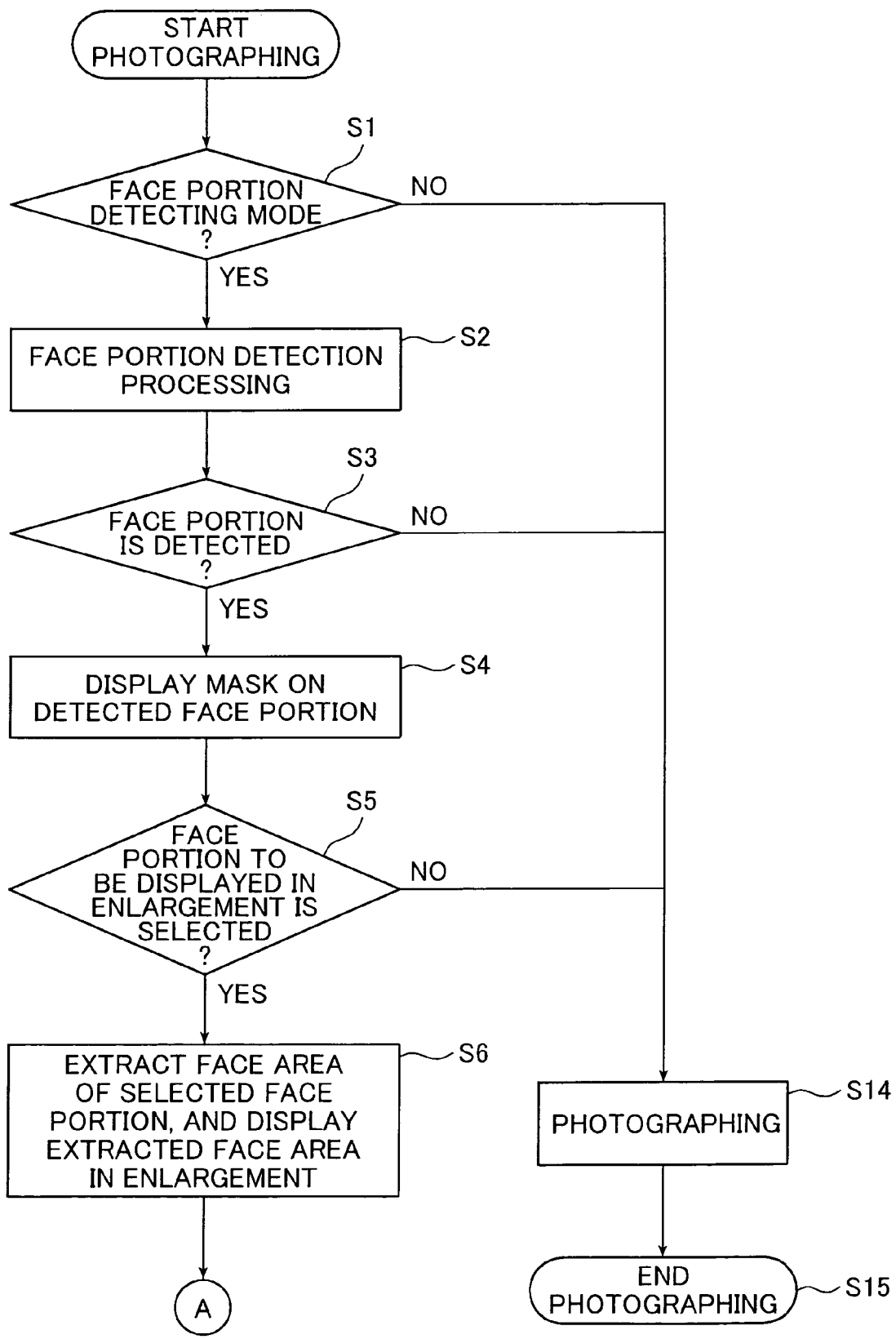
FIG. 2 is a flowchart showing a photographing method of the digital camera of the embodiment.
Figure 3:
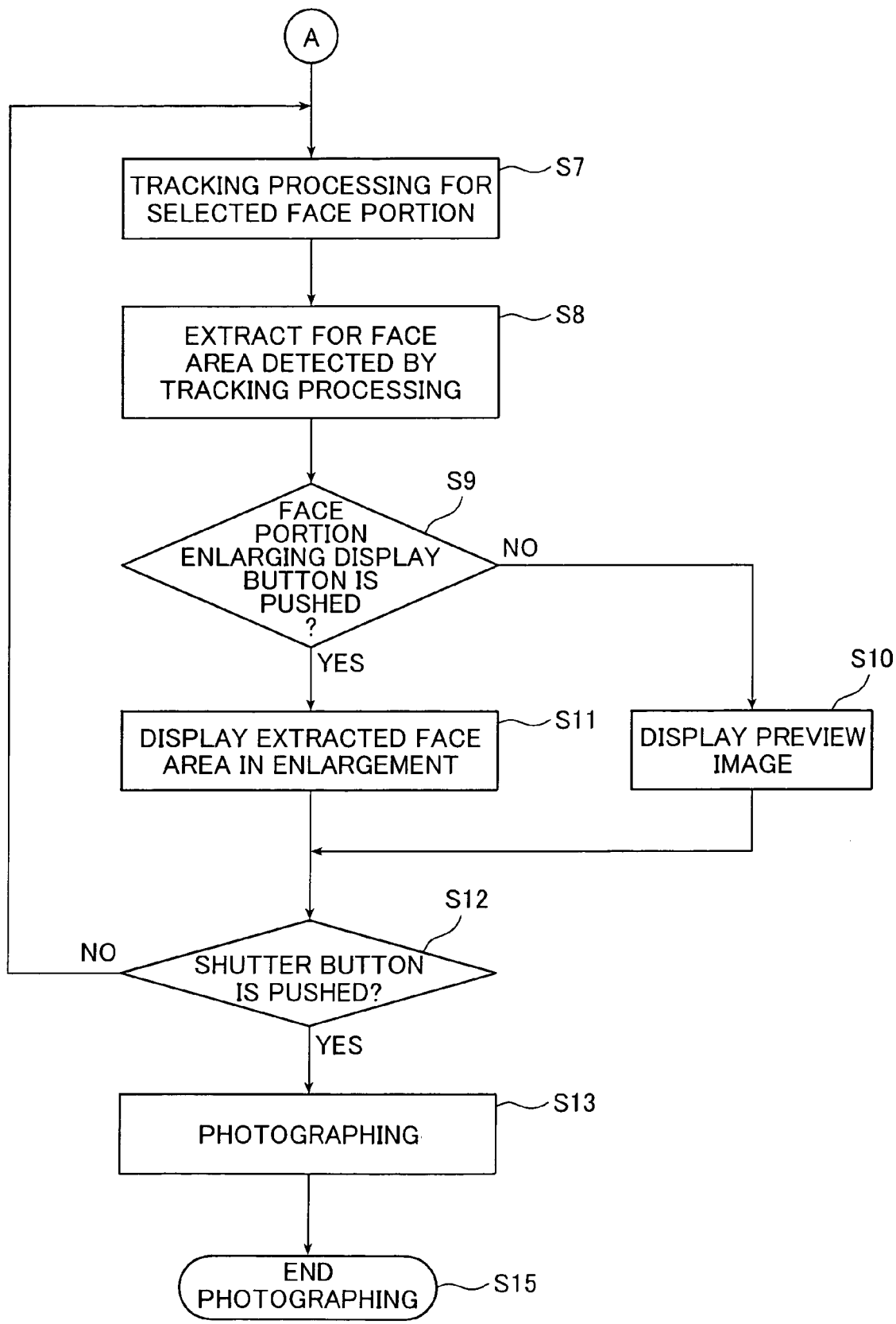
FIG. 3 is a flowchart showing steps following steps in FIG. 2.
Figure 4A:
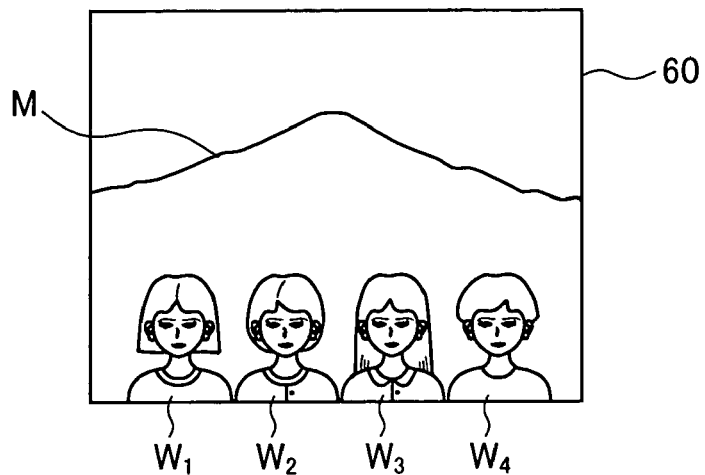
FIGS. 4A to 4C are schematic diagrams explaining a face portion detecting mode in the digital camera of the embodiment of the present invention.
Figure 4B:
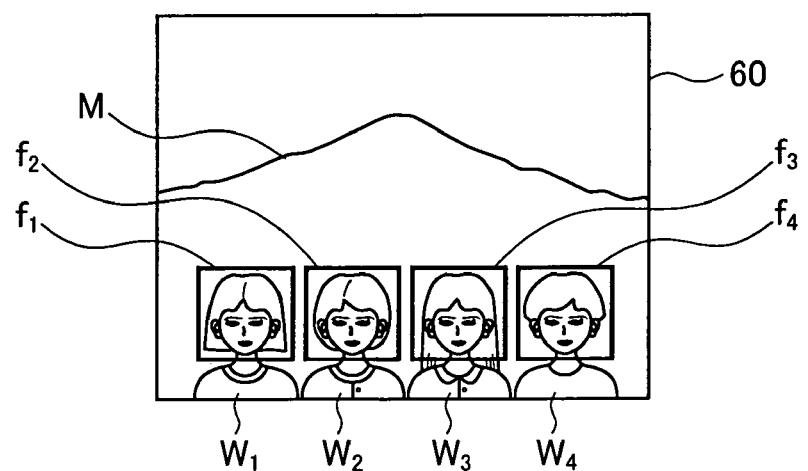
Figure 4C:
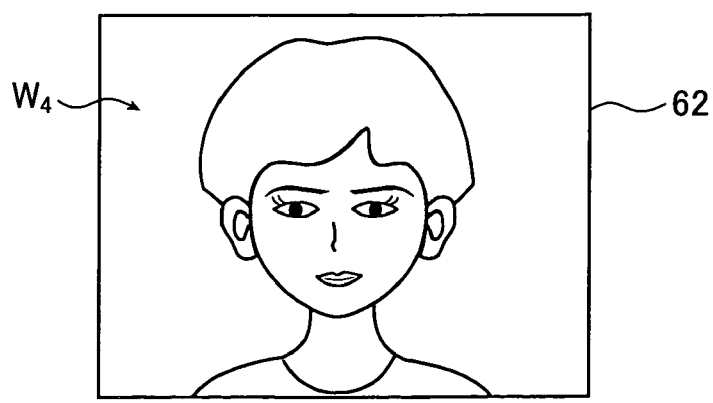

FIGS. 2 and 3 are a flowchart showing the photographing method of the digital camera of this embodiment. In addition, FIGS. 4A to 4C are schematic diagrams showing a face portion detecting mode along steps in the digital camera of this embodiment.

A photographer directs the digital camera 10 to a subject to be photographed at first. In this embodiment, as shown in FIG. 4A, the face portion detecting mode will be explained with the case where a mountain M and four women $W_1$ to $W_4$ are a scene and subjects, in which the four women $W_1$ to $W_4$ stand side by side with the background of the mountain M, is photographed as an example.

First, when the photographer directs the digital camera 10 to the subjects, a preview image 60 (see FIG. 4A) of the scene, in which the four women $W_1$ to $W_4$ stand side by side with the background of the mountain M, is displayed on the screen of the display unit 20. At this point, it is judged whether the face portions detecting mode is selected by the photographer using the mode switching button 19 (step S1).

When it is judged in step S1 that the face portion detecting mode is not selected, the scene is simply photographed and the image is captured (step S14).

On the other hand, when it is judged in step S1 that the face portion detecting mode is selected, face portion detecting processing is performed by the face portion detecting unit 25 for the image data captured by the photographing unit 12 (step S2).

Next, it is judged whether a face portion is detected by the face portion detecting unit 25 in step S2 (step S3).

When it is judged in step S3 that a face portion is not detected, the scene is simply photographed (step S14).

On the other hand, when it is judged in step S3 that face portions are detected, as shown in FIG. 4B, frames (masks) $f_1$ to $f_4$ are displayed respectively for the detected face portions, at areas including face portions of the women $W_1$ to $W_4$ (step S4). The preview image 60 in which the window frames are displayed is used for selecting a face portion by the photographer.

Next, it is judged whether a face portion to be displayed in enlargement is selected by the photographer using the face portion selecting button 28 (step S5).

Note that when it is judged in step S5 that any face portion to be displayed in enlargement is not selected, the scene is simply photographed (step S14), to capture a final photographed image, and the photographing is finished (step S15).

On the other hand, when it is judged in step S5 that a face portion to be displayed in enlargement is selected, a face area of the face portion selected by the face enlarging display button 27 is extracted, and the extracted face area is displayed in enlargement (step S6).

In this case, since the woman $W_4$ is selected, as shown in FIG. 4C, an enlarged image 62 of the face portion of the woman $W_4$ is displayed by the control unit 50. In this step S6, a face portion may be automatically displayed in enlargement when the face is selected even if the face enlarging display button 27 is not pushed. The display on the display unit 20 returns to the preview image 60 from the enlarged image 62 according to the release of the face enlarging display button 27.

Note that, when the photographer judges from the face portion displayed in enlargement in step S6 that the selected woman $W_4$ has an expressive countenance enough to be for the photographer, the photographer may push the shutter button 18 to photograph the scene.

Next, for the face area of the selected woman $W_4$, tracking processing is performed in the preview image 60 (step S7). In this case, in step S7, the face area of the woman $W_4$ is not displayed in enlargement but the preview image 60 as shown in FIG. 4A is displayed.

In this embodiment, until the shutter button 18 is pushed and a final image is captured, the preview image 60 is sequentially updated at predetermined time intervals (short intervals). Therefore, it is necessary to track a face area with tracking processing such that a face portion of the selected subject continues being displayed in enlargement appropriately according to the hold of the face enlarging display button 27 pushed. Note that, if load of work in the face portion detecting unit 25 does not cause a problem practically, a face area of the subject selected by the processing of the face portion detecting unit 25 may be detected, and the tracking processing unit 30 is not always necessary.

In step S7, the face portion selected in the preview image 60 is tracked by the tracking processing unit 30 again, and window frames are displayed as in step S4. Then, image data of the face area tracked in this way is extracted (step S8).

Next, it is judged whether the face enlarging display button 27 is pushed by the photographer (step S9).

When it is judged in step S9 that the face enlarging display button 27 is not pushed, the preview image 60 of the scene shown in FIG. 4A is displayed while step S8 continues (step S10).

On the other hand, when it is judged in step S9 that the face enlarging display button 27 is pushed, the extracted face area (face image) is displayed in enlargement (step S11).

In both steps S10 and S11, it is judged whether the shutter button 18 is pushed (step S12).

In this case, if the shutter button 18 is pushed, the image displayed on the display unit 20 is captured as a final image (step S13). Consequently, the photographing is finished (step S15).

On the other hand, when it is judged in step S12 that the shutter button 18 is not pushed, the processing returns to step S7, and the tracking processing for the image is continued. After that, steps S7 to S12 are repeated. Steps S7 to S12 are repeated until a desired scene occurs, where the woman $W_4$ has a desired countenance for the photographer.

In this way, in this embodiment, when a display unit is small and a person or the like is photographed together with scenery, even if the person is displayed in a small size and it is hard to distinguish various expressions of the face, the face is detected and displayed in enlargement, whereby the various expressions on the face can be identified to obtain a final image. Thus, a photographer can recognize the person to be photographed closes eyes or not and obtain a desired final image.

In addition, in this embodiment, the tracking processing unit 30 is provided, whereby the face portion detecting unit 25 detects a face portion just one time in each photographing. Thus, processing load of work in a processing unit for image analysis can be reduced.

While the face of a person to be photographed is considered as a specified portion of the subject and the face portion detection and the face enlarging display are performed in this embodiment, the specified portion which is to be displayed in enlargement is not limited to the face. In an exemplary configuration, the already-known image information (image characteristic quantities) concerning the shape or color of the specified portion of interest is held in advance and the portions of the subject which are in conformity to the information are detected as the specified portion. From among the detected portions, at least one is selected and the area including the selected portion is tracked on the display unit 20. The image of the area thus tracked is enlarged on the display unit 20. The method of detecting the specified portion of interest using the already-known image information concerning the shape or color of the portion is exemplified by "Real-Time Tracking of Non-Rigid Objects Using Mean Shift" by Dorin Comaniciu, Visvanthan Ramesh, and Peter Meer, CVPR 2000.

In the present invention, the specified portion of the subject is not limited to a portion which has the already-known image information. For example, the image information can be calculated and obtained as the specified portion of the subject by applying the above mentioned face portion detecting method (JP 2000-137788 A, JP 2000-149018 A, JP 2000-148980 A) or the detecting method of above mentioned of "Real-Time Tracking of Non-Rigid Objects Using Mean Shift" to an image in an central area of the divided nine areas of the screen of the display unit 20, the screen divided laterally three ways and vertically three ways respectively. The calculation starts when the shutter button gets pushed halfway. Before the shutter button gets pushed halfway, the digital camera 10 has to be oriented and directed to the subject such that the portion of the subject to be tracked is inside the central area of the screen. The digital camera 10 is configured to continue detecting and tracking the specified portion of the subject based on the calculated image information and display the portion in enlargement in the display unit 20.

Figure 5:
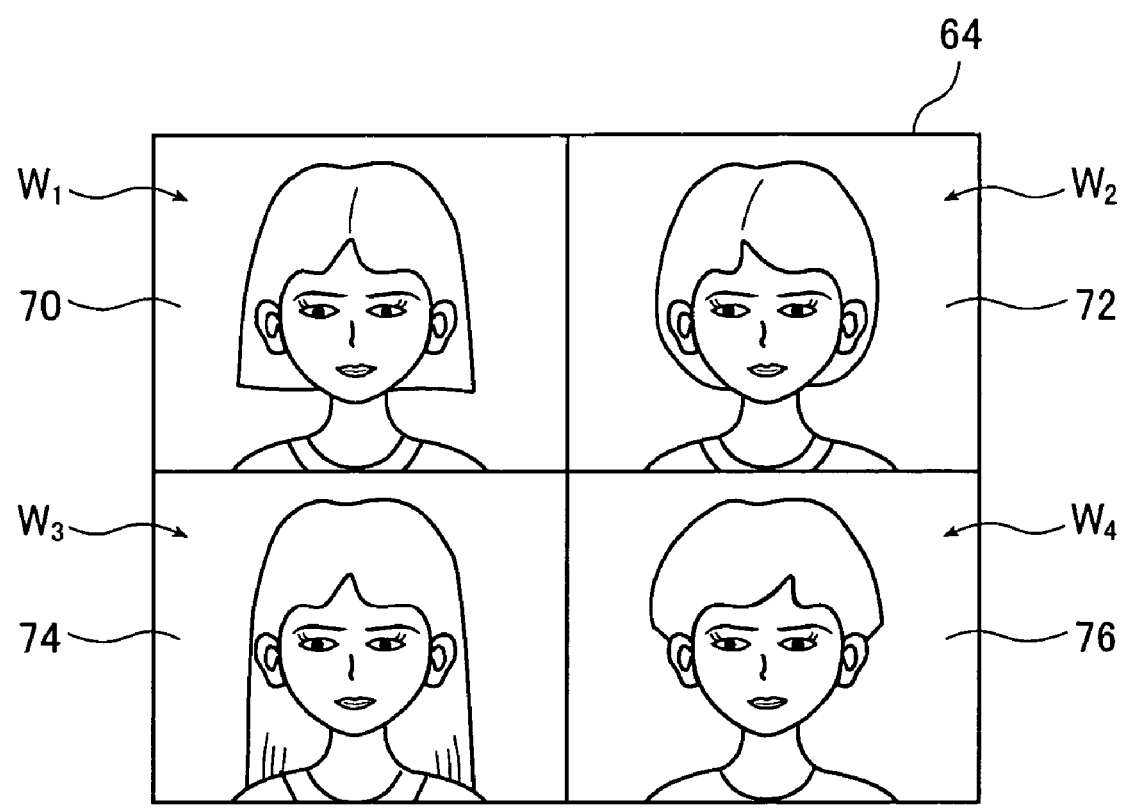
FIG. 5 is a schematic diagram showing another display method of an enlarged image of the embodiment of the present invention.

As shown in FIG. 5, it is also possible that a screen 64 of the display unit 20 be divided into display areas 70 to 76, the number of which is the same as the number of detected face portions, and the faces of the women $W_1$ to $W_4$ be displayed on the display areas 70 to 76, respectively.

Moreover, in this embodiment, an entire image and an enlarge image of a local area of a face portion can be obtained. Thus, a final image having a high-quality can be obtained.

Furthermore, in this embodiment, the face portion selecting button is provided, whereby a photographer becomes capable of judging propriety of face portion detection, and an adverse effect of misdetection by the face portion detecting unit 25 can be controlled. The adverse effect of misdetection is that, for example, an image area except a face portion, which is detected by mistake, is extracted and displayed in enlargement.

In addition, in the digital camera of this embodiment, the face enlarging display button is provided. However, the present invention is not limited to this. For example, it is also possible that, when a face portion is selected by the face portion selecting button, when the shutter button is pushed by half, a face area is displayed in enlargement.

Moreover, the screen of the display unit 20 may be divided into, for example, two such that an entire image of a subject and an enlarged image are displayed simultaneously. In this case, when one face portion is detected, an enlarged face portion is displayed without push of the face enlarging display button.

Note that at least one of an expression recognition unit and a sight-line detecting unit may be provided in the digital camera of this embodiment in addition to the face portion detecting unit such that a photographer can automatically obtain an image of a desired subject based on a desired expression of a detected face portion or a desired direction of a sight-line.

The present invention is basically as described above. The digital camera of the present invention has been explained in detailed. However, it is needless to mention that the present invention is not limited to the above-described embodiment and various improvements and modifications may be made in a range not departing from the spirit of the present invention.

What is claimed is:

1. A digital camera comprising:
    an image capturing unit that photoelectrically captures an image of a subject including a face portion of the subject to obtain image data of the subject;
    a display unit that displays an image of the subject based on the image data obtained by the image capturing unit;
    a face portion detecting unit that detects face portion of the subject from the image data captured by the image capturing unit;
    face portion selecting means that selects a face portion detected by the face portion detecting unit as a main subject to which attention is to be paid;
    a control unit that controls the display unit to display a face image of the face portion selected by the face portion selecting means, in enlargement; and
    a tracking processing unit that tracks the face portion, which is selected by the face portion selecting means, on the display unit,
    wherein the control unit controls the display unit to display the face image of the face portion of the subject, which is selected by the face portion selecting means and tracked by the tracking processing unit, in enlargement according to an instruction for enlarged display, and wherein in a condition that plural face portions are detected from the image data, plural face portions are selected by the face portion selecting means, and the enlarged display of the face images is instructed, the control unit divides a display screen of the display unit into plural areas and controls the display unit to display plural face images in enlargement in the plural areas, individually.

2. The digital camera according to claim 1, further comprising a recording unit that records, as information, one or both of an image size of the face portion selected by the face portion selecting means on one hand, and position information of the selected face portion with respect to the image of the subject on the other, as well as the image data.

3. The digital camera according to claim 1, wherein the detected face portions are each surrounded by a frame, indicating the face portion.

4. The digital camera according to claim 3, wherein the face portion selecting means changes color of the frame surrounding the detected face portion when the frame is selected.

5. The digital camera according to claim 1, wherein the control unit divides a display screen of the display unit into plural areas and controls the display unit to display a face image in enlargement in one area and the image obtained by the image capturing unit in the other.

6. The digital camera according to claim 1, wherein a user can select a size of the enlarged display.

7. The digital camera according to claim 1, wherein the plural areas cover the entire screen.

8. The digital camera according to claim 1, wherein each of the enlarged plural face images are displayed simultaneously.

9. The digital camera according to claim 1, further comprising a recording unit that records, as information, both of an image size of the face portion selected by the face portion selecting means, and position information of the selected face portion with respect to the image of the subject, as well as the image data.

* * * * *